Figure 1:
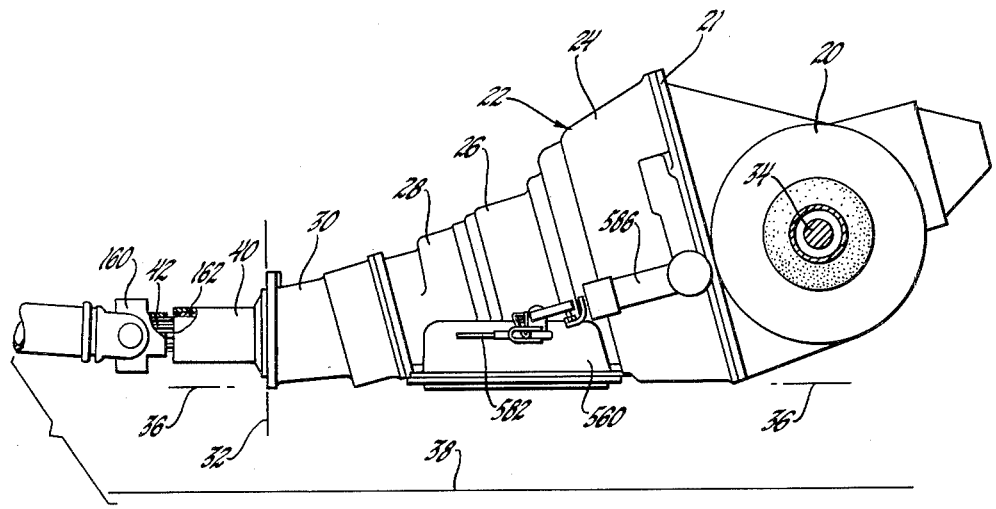

July 3, 1962 G. K. HAUSE 3,042,162
TRANSMISSION

Original Filed April 24, 1957 2 Sheets-Sheet 1

INVENTOR.
Gilbert K. Hause
BY
T. L. Chisholm
ATTORNEY

INVENTOR.
Gilbert K. Hause
BY T. L. Chisholm
ATTORNEY

United States Patent Office 3,042,162
Patented July 3, 1962

3,042,162
TRANSMISSION
Gilbert Kenneth Hause, Bloomfield Hills, Mich., assignor to General Motors Corporation, Detroit, Mich., a corporation of Delaware
Original application Apr. 24, 1957, Ser. No. 654,771. Divided and this application Sept. 30, 1959, Ser. No. 843,558
2 Claims. (Cl. 192—4)

This invention relates to transmissions and final drives for automobiles. This application is a division of my application, Serial Number 654,771, filed April 24, 1957, the disclosure of which is incorporated herein by reference.

Car designers are now trying to make cars low while providing adequate ground clearance. When this was attempted with the types and arrangements of transmission, propeller shaft and differential housing formerly available, it required the transmission and propeller shaft to be placed above the floor level of the car. Therefore, a so-called tunnel was used to separate the drive line from the interior of the car. The tunnel is undesirable, and efforts have been made to eliminate it or reduce its height. One such effort as disclosed in said application, involves a unitary assembly of the transmission housing and differential housing which is placed in the space under or behind the rear seat and tilted about the axis of the rear wheels to lower the front end of the transmission. This lowers the propeller shaft.

It is among the objects of the invention of this divisional application to provide an improved construction and arrangement of hydrodynamic torque transmitter and an improved arrangement of parking brake or lock which is especially adapted to be used with such improved transmission. The invention particularly is adapted to torque converters which multiply torque, but it is also applicable to hydrodynamic torque transmitters generally.

These and other objects and advantages of the invention will appear in the following description and accompanying drawings.

Figure 2:
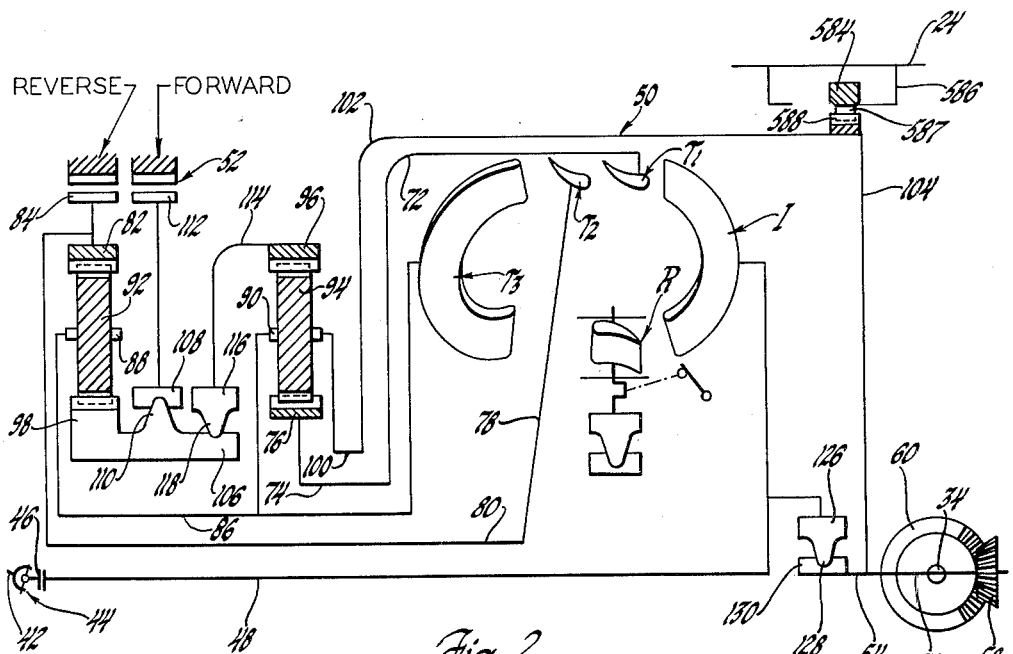
Figure 3:
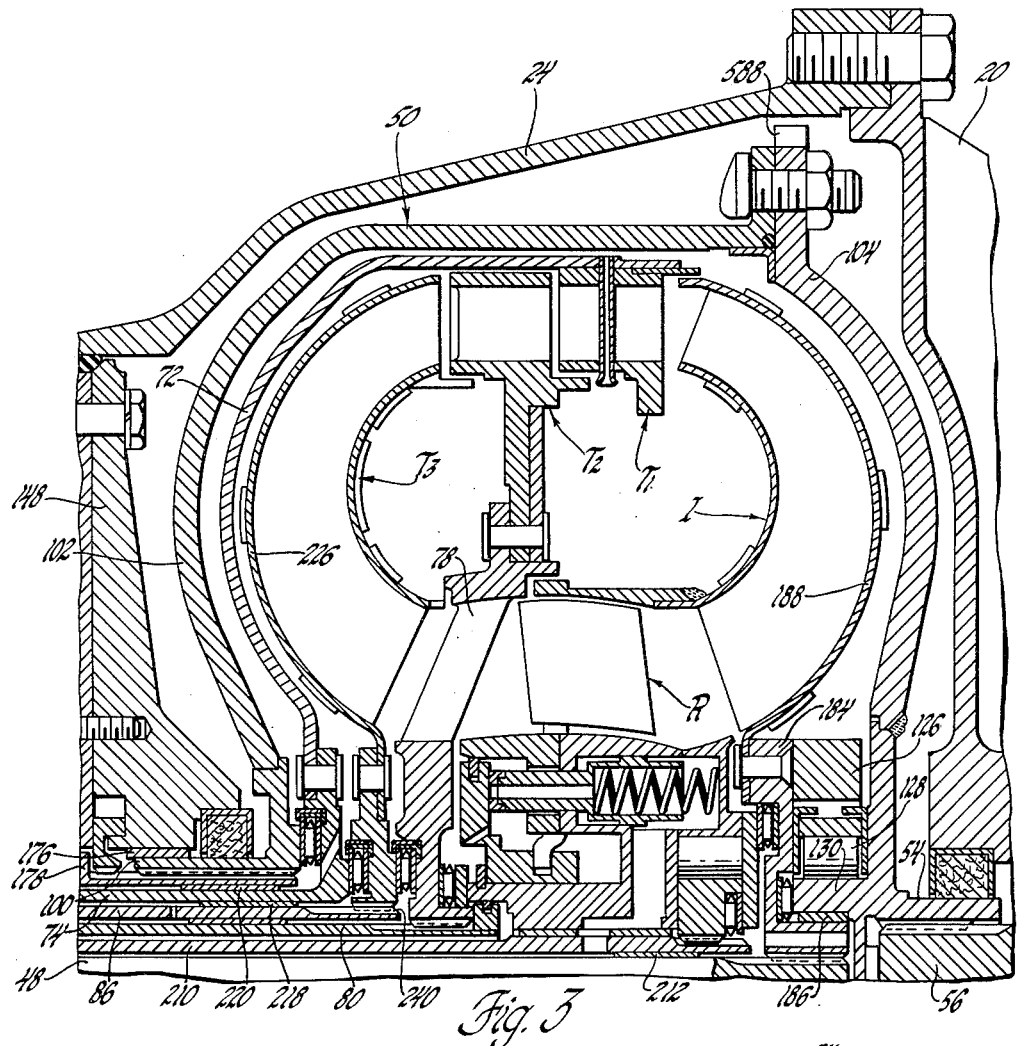
Figure 4:
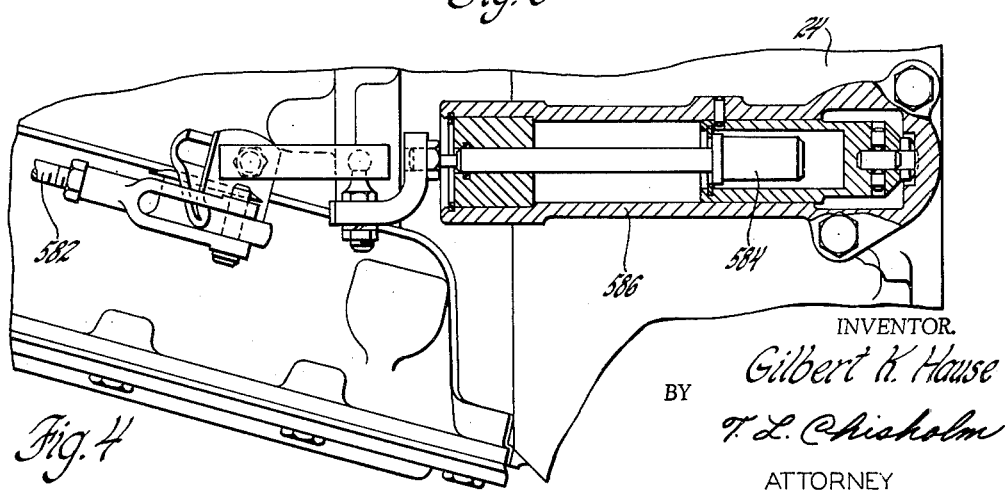

In the drawings:

FIG. 1 is a side elevation of a transmission and differential assembly embodying one form of the invention, showing the relationship of this assembly to the ground when the transmission is placed in a car, FIG. 2 is a schematic upper half of a vertical longitudinal section which is symmetrical about the axis of rotation of a transmission and differential assembly embodying one form of the invention. In this and succeeding figures the transmission is shown with its axis parallel to the ground, for convenience in reading the drawings, this being a different position than shown in FIG. 1, FIG. 3 is one-half of a symmetrical section showing one form of actual construction of a torque converter, in front of the differential, FIG. 4 is an elevation, partly in section of a parking brake actuator.

General Arrangement

Referring to FIG. 1 the transmission and differential assembly includes a differential housing 20 having a generally circular front wall 21 to which is bolted a stationary casing in the form of a transmission housing designated as a whole by 22 which includes a torque transmitter housing 24, a gear housing 26, a clutch housing 28 and may include a universal joint housing 30, all secured together in any suitable manner from rear to front in the order named.

The transmission housing 22 is of tapering form and can in general be contained within a truncated cone whose larger base is the front wall 21 of the differential housing 20, and whose smaller base is a circle in a plane whose trace in FIG. 1 is the line 32 at the front end of the universal joint housing 30. The entire assembly can be rotated about the axis of the drive axles 34 of the usual differential and may be placed in the car so that the lowermost geometrical element of the truncated cone, which element is represented by the broken line 36, is disposed substantially parallel to the level surface of the ground 38. This arrangement makes it possible for the largest part of the transmission housing to be placed in the space under or behind the rear seat of a car without taking up any room above the normal lower surface of the car body and permits the customary propeller shaft of the car to enter the transmission housing at an angle to place the propeller shaft as low as possible with respect to the car body and thus reduce the height of, or eliminate, any tunnel in the car floor which may be necessary to accommodate the propeller shaft or its housing. To this end the universal joint housing includes a bearing retainer 40 for the drive shaft disposed at an angle to the axis of the transmission to receive a propeller shaft which is substantially parallel to the ground.

The transmission housing encloses a transmission schematically shown in FIG. 2 and a portion of which is structurally illustrated in FIG. 3.

Referring to FIG. 2 a power input shaft 42, which may be connected to, or a part of, a customary propeller shaft driven by the engine of the car, is connected to a universal joint 44 which through clutch 46 can selectively be connected to or disconnected from a transmission input shaft 48 which drives a hydrodynamic torque transmitter, preferably a torque converter 50, which drives a planetary forward and reverse reduction gearing 52 physically disposed between the torque converter and the clutch 46. The gearing drives a transmission output shaft 54 connected to the input shaft 56 of the differential and driving the input pinion gear 58 which meshes with the differential ring gear 60 which drives the axles 34 of the rear wheels in any suitable known manner.

Referring to FIG. 2 the torque converter includes a pump or impeller I of generally known form rotated by the input shaft 48.

A first turbine $T_1$ receives liquid from the pump and discharges it to a second turbine $T_2$ which in turn discharges the liquid to a third turbine $T_3$ which returns the liquid to the impeller I through a stator or reaction member R.

The first turbine $T_1$ is connected by a drum 72 and shaft 74 to drive the input sun gear 76 of a first or rear planetary gear set. The second turbine $T_2$ is connected by a spider 78 and shaft 80 to drive the input ring gear 82 of a second or front planetary gear set. The ring gear can be held fast by a reverse torque-establishing device 84 to effect reverse drive. The third turbine $T_3$ is connected by a shaft 86 to drive the carriers 88 and 90, respectively, of the front and rear planetary gear sets, which carriers support front planetary pinions 92 meshing with the front input ring gear 82 and rear planetary pinions 94 which mesh with the rear input sun gear 76. A rear reaction ring gear 96 meshing with planet pinions 94 completes the rear planetary gear set, and a reaction sun gear 98 meshing with the planet pinions 92 completes the front planetary gear set.

The $T_3$ shaft 86 is the principal output shaft of the torque converter, and through carrier 90 it is connected to a transmission output member 100 physically located between the torque converter and the gearing. A drum 102 and flange 104 collectively form a transmission output casing surrounding the torque converter which output casing connects the output member 100 to the transmission output shaft 54.

Heretofore the various definitions of the terms clutch and brake have caused confusion. Some attempts to define the terms have been based on use or function regardless of structure while others have been based on type of structure or arrangement, regardless of use or function. This has sometimes lead to the definitions of clutch and brake being mutually exclusive where they should not be, and has lead to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch as described by reference to structure where the point in interest is the function of the device regardless of its structure. To avoid this confusion and indefiniteness the term torque-establishing device is used herein generically to mean any device which can be engaged to prevent rotation between two members which otherwise are relatively rotatable. If both members are rotatable absolutely the torque-establishing device when engaged forces them to rotate at the same speed so that one member drives the other. In this case the torque-establishing device may be defined more specifically as a drive clutch. If one of the members is fixed then engagement of the clutch holds the other member fast, in which case the generic torque-establishing device may be sometimes referred to as a brake or lock. Where the torque-establishing device prevents relative rotation between two members in one sense but permits relative rotation in the opposite sense then the torque-establishing device may be sub-generically defined as a one-way clutch or ratchet device which is used to mean any device between two relatively rotatable members which permits the first member to rotate in one sense with respect to the second member but prevents the first member from rotating in the opposite sense with respect to the second member, that is locks the two members together. This device is sometimes called a freewheeler. If both members are rotatable absolutely the freewheeler is a one-way drive clutch. If one of the members cannot rotate, the freewheeler is sometimes called a one-way brake.

The sun gear 98 is formed integral with a freewheeler member 106 the upper half of which as represented in FIG. 2 can turn forward, that is out of the plane of the paper toward the eye of the observer with respect to a second freewheeler member 108. The freewheeler is completed, as symbolically represented in FIG. 2 by a ratchet member 110 which is fixed to the member 106 and engages the member 108 if the member 106 tends to rotate backward. The member 108 is rotationally fixed to a forward torque-establishing device 112 which can be held to prevent rotation of the freewheeler element 108. When this occurs the sun gear 98 is positively held against reverse rotation but may rotate forward with respect to the ratchet device 106—110—108. The rear ring gear 96 is rotationally fixed to a drum 114 to a member 116 of a second ratchet device having a ratchet element 118 which engages the member 106 whenever the member 116 tends to rotate backward but permits the ratchet member 116 to rotate forward out of the plane of the paper toward the eye of the observer with respect to the ratchet member 106. In the structure described herein the freewheelers 106—110—108 and 106—118—116 are both generically one-way torque-establishing devices. Both freewheelers always function as the species sometimes called brake when the forward torque-establishing device 112 is set. However, when the forward torque-establishing device 112 is released and the reverse torque-establishing device 84 is set the ring gear 96 can drive the sun gear 98 backward through the freewheeler 106—118—116 which functions as a one-way drive clutch and not as a one-way brake.

In order to prevent the car running faster than the engine and thus in order to provide engine braking, I place a freewheeler between the input shaft 48 and the output shaft 54. This is represented schematically in FIG. 2 by the member 126 secured to the drive shaft 48 and fixed to a ratchet member 128 which engages member 130 secured to the shaft 54. Whenever the output shaft tends to rotate faster than the input shaft 48, the freewheeler 130—128—126 locks to cause the car to drive the engine.

*Operation of General Arrangement*

For the purposes of this invention it suffices to say that when the forward torque-establishing device 52 is set and the reverse torque-establishing device 84 is released rotation of the engine shaft 42 causes the torque converter and gearing to rotate the output drum casing 102, 104 forward at various ratios of speed with reference to the speed of the engine shaft, as is known, and when the reverse torque-establishing device 84 is set and the forward torque-establishing device 52 is released rotation of the engine shaft rotates the output casing backward at varying speed ratios.

Referring to FIG. 3 the transmission output member 100 is a sleeve formed with an integral radial flange welded to the output shell or casing 102 and splined to a sleeve 178 integral with or secured to a part of the rear planet carrier 90. The sleeve 100 is supported for rotation in a radial bearing 176 in the flange 148 forming part of the casing 24. The shell 102 extends around the torque converter and is bolted to the flange 104 to form the transmission output casing 102, 104. The flange 104 is integral with or secured to a central tubular shaft or socket 54 which is the previously mentioned final output shaft 54 of the transmission shown diagrammatically in FIG. 2. The shaft 54 is splined to the differential input shaft 56. Thus the entire output assembly of the transmission consisting of output member 100, shell 102, flange 104 and final output shaft 54 is positioned and supported for rotation in the casing 22 by the front bearing sleeve 176 and by the usual differential bearings which support the differential input shaft 56 as disclosed in said application, referred to herein. A portion of the shaft 54 extends to the left inside the flange 104 to form the previously mentioned inner race 130 of the one-way clutch diagrammatically illustrated in FIG. 2. The outer race 126 of this clutch takes the form of the ring 126 shown in FIG. 3 which surrounds one-way rollers or sprags 128 which are the ratchet member 128 of FIG. 2. The outer race is fixed to a flange 184 which flange is supported for rotation on the inner side of the portion 130 of the shaft 54 by a radial bearing sleeve 186 and is splined to the right-hand end of the transmission input shaft 48. This supports the right-hand end of the shaft 48 for rotation through the bearing sleeve 186 and transmission output shaft 54, differential input shaft 56 and its bearings. In the impeller, the customary outer shell 188 is riveted to the flange 184 and thus is connected to input shaft 48, the left-hand or front end of which is support for rotation in suitable bearings, as described in my application, referred to herein.

The various shafts of the torque converter and gearing will be described in the order in which they are placed with reference to the axis of the transmission.

The transmission input shaft 48 is at the axis. Surrounding the input shaft and spaced from it to form a stator control passage is a stator support or ground sleeve 210 which extends forward through the gearing and is fixed against rotation. The right or rear end of the sleeve 210 supported by a bearing sleeve 212 on the transmission input shaft 48. The second turbine shaft 80 is outside the ground sleeve 210 and inside of the third turbine shaft 86 which in turn is supported by a bearing sleeve 218 in the rear end of the first turbine shaft 74 which in turn is supported by bearing sleeve 220 in the output sleeve 178, referred to, which in turn is supported by the bearing 176. Thus the rear ends of all of the rotating turbine assemblies are supported radially from the transmission housing 22 by the flange 148 and the bearings referred to. The third turbine shaft 86 extends forward through both gearsets and is supported at its left end for rotation by a bearing sleeve on the second turbine shaft 80 as disclosed in said application, referred to herein.

The first turbine is fixed to the first turbine shaft 74 by being attached to the shell 72 which is disposed just inside the shell 102 and at its center is riveted to a flange which may be integral with the shaft 74.

The second turbine $T_2$ is attached to its output shaft 80 through the spider 78 which at its center is splined to the rear end of the shaft 80.

The third turbine includes an outer shell 226 which latter is riveted to a hub splined to the right end of the $T_3$ shaft 86.

The control casing 560 (FIG. 4) supports a linkage 582, in FIG. 1, operable from the driver's seat. The linkage 582 is connected to a parking brake actuator 584 disposed in casing 586 attached to, or forming part of, the stationary casing 24. The actuator moves a locking tooth or pawl 587 between the teeth of a locking gear 588 (FIG. 3) to form a positive lock whenever the linkage 582 is moved to the parking position.

The locking gear 588 may be integral with the flange 104 or attached to it. Conveniently the parking gear may be the conventional starter gear customarily secured to the front flange of a torque converter. This provides a parking lock of the greatest possible diameter located at the point of maximum diameter of the entire transmission. This gives the parking lock great leverage, promoting positive and secure parking lock with light parts, easily actuated.

I claim:

1. A transmission comprising in combinaton an input shaft driving a hydrodynamic torque transmitter which drives an output shaft in alignment with the input shaft, the torque transmitter including an impeller and a turbine both surrounding the input shaft for circulating liquid and including an output casing operatively connected to the turbine, said casing surrounding the turbine and impeller and being continuously connected to said output shaft, a stationary casing surrounding the output casing, first locking means attached to the output casing at its maximum diameter, and cooperating locking means on the stationary casing for engaging the first locking means to prevent rotation of the output shaft.

2. A transmission comprising in combination an input shaft driving a hydrodynamic torque transmitter which drives an output shaft in alignment with the input shaft, the troque transmitter including an impeller and a turbine both surrounding the input shaft for circulating liquid and including an output casing operatively connected to the turbine, said casing surrounding the turbine and impeller and being continuously connected to said output shaft, a stationary casing surrounding the output casing and locking means on the stationary casing for engaging the output casing at its maximum diameter to prevent rotation of the output shaft.

References Cited in the file of this patent
UNITED STATES PATENTS

| | | |
|---|---|---|
| 1,960,705 | Kochling | May 19, 1934 |
| 1,978,172 | Sinclair | Oc. 23, 1934 |
| 2,320,758 | Sinclair | June 1, 1943 |
| 2,653,689 | Hasbany | Sept. 29, 1953 |
| 2,926,551 | Howard | Mar. 1, 1960 |

FOREIGN PATENTS

| | | |
|---|---|---|
| 251,900 | Great Britain | May 13, 1926 |